Figure 1:
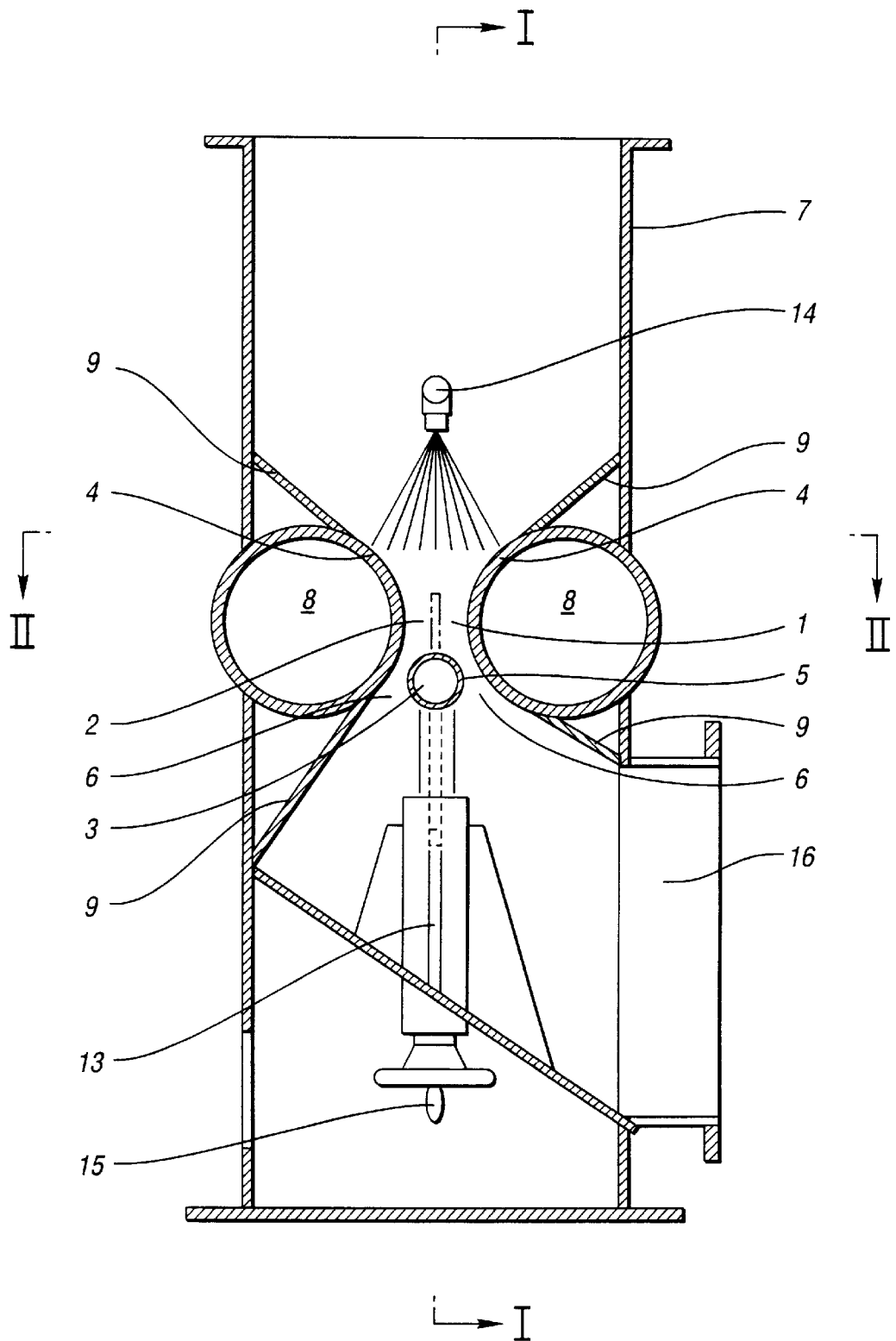

United States Patent
Reither

[19]

[11] Patent Number: 5,826,800
[45] Date of Patent: Oct. 27, 1998

[54] VENTURI CLEANING SYSTEM WITH TWO ADJUSTABLE VENTURI GROOVES

[76] Inventor: Karl Reither, Freiheitsstrasse 45, Troisdorf, Germany, 53842

[21] Appl. No.: 605,218

[22] PCT Filed: Aug. 19, 1994

[86] PCT No.: PCT/DE94/00959

§ 371 Date: Mar. 11, 1996

§ 102(e) Date: Mar. 11, 1996

[87] PCT Pub. No.: WO95/07747

PCT Pub. Date: Mar. 23, 1995

[30]   Foreign Application Priority Data

Sep. 15, 1993 [DE] Germany ............... 43 81 301.9

[51] Int. Cl.$^6$ ........................................ B05B 1/26
[52] U.S. Cl. .................. 239/505; 239/514; 261/112.1
[58] Field of Search .......................... 239/505, 506, 239/507, 513, 514; 55/226, 241; 261/62, 112.1, DIG. 54

[56]   References Cited

U.S. PATENT DOCUMENTS

| | | | |
|---|---|---|---|
| 3,393,901 | 7/1968 | Krause | 261/62 |
| 3,517,485 | 6/1970 | Dell'agnese et al. | 55/226 |
| 3,544,086 | 12/1970 | Willett | 261/62 |
| 3,690,044 | 9/1972 | Boresta | 55/223 |
| 4,023,942 | 5/1977 | Brady et al. | 55/241 |

FOREIGN PATENT DOCUMENTS

| | | |
|---|---|---|
| 369664 | 6/1982 | Austria . |
| 064712 | 2/1951 | Germany . |
| 093802 | 2/1963 | Germany . |
| 1253238 | 11/1967 | Germany . |
| 1256198 | 12/1967 | Germany . |
| 2126213 | 12/1972 | Germany . |
| 2410591 | 7/1975 | Germany . |
| 7525946 | 8/1975 | Germany . |
| 2417569 | 9/1978 | Germany . |
| 3029073 | 3/1982 | Germany . |
| 287413 | 2/1991 | Germany . |

*Primary Examiner*—Andres Kashnikow
*Assistant Examiner*—Lisa Ann Douglas
*Attorney, Agent, or Firm*—Brooks & Kushman P.C.

[57]   ABSTRACT

The invention relates to a differential pressure cleaning system consisting of a flow pipe (7) with a throttle (1) and at least one cleaning fluid feed device (14) fitted over the throttle (1) for treating exhaust gases from technical processes which give off mixtures of gases, vapors and dusts. The throttle (1) located in the flow pipe (7) takes the form of an approximately rectangular slot (2) at its narrowest point. A displacement body (3) is arranged downstream of the slot (2), extending over the entire length of the slot and mounted in such a way as to be movable towards and away from the slot (2). This provides two roughly parallel venturi grooves (6) between the walls of the throttle (1) and the outer wall of the displacement body. The cross-sections of these two venturi grooves (6) can be adjusted as desired by moving the displacement body (3). The throttle (1) in the flow pipe (7) is preferably realised by two commercially available transverse pipes (8) displaying a circular cross-section. The flow pipe (7) and the displacement body (3) may also be made of commercially available pipes with a circular cross-section.

17 Claims, 4 Drawing Sheets

VENTURI CLEANING SYSTEM WITH TWO ADJUSTABLE VENTURI GROOVES

The invention relates to a differential pressure cleaning system consisting of a flow pipe with a throttle and at least one cleaning fluid feed device fitted over the throttle.

The exhaust gases from technical processes are generally mixtures of gases, vapours and dusts. The dust-like, i.e. disperse proportion, can occur in the carrier gas in both solid and liquid form. The separation of solid or liquid particles, as well as the separation of a gaseous component from the gaseous dispersing agent, are part of the processes of mass transfer.

Acceleration and deceleration of the gas flow and of an injected cleaning fluid causes turbulent vortexing of the gas, dust and liquid droplets with one another. This results in very rapid wetting of the dust particles and accelerates chemical reactions. The energy required for the separation process is provided by the flow energy of the gas to be scrubbed. If the process involves hot gases, in particular, which must be cooled, condensation processes are also used, these being characterized by enthalpy reduction and utilisation of the dust particles as condensation nuclei.

Part of the flow energy is lost as a result of the interaction between the cleaning fluid and the dispersion agent. The unavoidable occurrence of friction in this context leads to the dissipation of energy, i.e. to a pressure loss and an additional pressure gradient in the direction of the gas flow.

The energy consumed naturally increases with the difficulty of the mass transfer process. Therefore, in the case of high gas-scrubbing demands, cleaners are used through which the gas flows at high velocities.

These wet scrubbers are known as "differential pressure cleaning systems" due to the comparatively great pressure differences occurring in them.

The most commonly, used differential pressure cleaning system is the venturi cleaning system, of which numerous designs exist. This type of cleaning system is typified by the venturi pipe, where the cleaning fluid is injected at low Pressure at the narrowest cross-section, the throttle, via an axial injector or via a transverse injector. As a result of the intense shearing effect of the gas flow, the liquid particles are torn into ultrafine droplets. The high acceleration of the gas in the throttle and the resultant high relative velocity between the dust particles and the droplets are the reason for the very good separating properties of the venturi cleaning system. Depending on the separation performance, the pressure loss is between 3,000 and 2,000 pascal. The exact pressure loss depends on the gas velocity and the quantity of cleaning fluid injected.

A venturi cleaning system reacts very strongly to fluctuations in load on account of the connection between separation performance and flow velocity. This problem is counteracted technically by changing the cross-section of the venturi throttle, where the throttle cross-section is designed as a rectangular slot and the longitudinal walls are adjustable. However, the problem of load fluctuations can also be overcome by sucking in secondary air or ambient air. However, both approaches to solving the problem of load fluctuations involve an enormous design effort.

Another type of differential pressure cleaner is the annular gap cleaner. In this type of cleaner, the change in cross-section is achieved by vertically displacing a conical, centrally-fitted displacement body, such as a conical and axially movable adjusting body, which forms an annular gap with the housing. The annular gap between the conical displacement body and the housing, through which the gas flows, then serves as a mixing stage for the cleaning fluid and the gas to be cleaned. On account of the relatively small adjustable annular gap, the spraying density and gas velocity are extraordinarily high, which is an essential factor in the scrubbing process.

The disadvantage of annular gap cleaners, however, is the extraordinary design effort involved, as the conical displacement bodies, in particular, are relatively difficult to manufacture and annular gap cleaners require more Space than venturi cleaning systems. Furthermore, the separation performance of annular gap cleaners is poorer than that of venturi cleaning systems, as becomes particularly noticeable when scrubbing gases bearing condensation and sublimation dust.

Therefore, the task of the present invention is to develop a differential pressure cleaning system which provides a good separation performance without a high pressure loss, i.e. which can be rapidly adjusted to load fluctuations, and which can be realised by means of a simple design.

According to the invention, the task is solved by the fact that the throttle located in the flow pipe takes the form of an approximately rectangular slot at its narrowest point and that a displacement body is arranged downstream of the slot, extending over the entire length of the slot and mounted in such a way as to be movable towards and away from the slot, which provides two roughly parallel venturi grooves between the walls of the throttle and the outer wall of the displacement body, and where the cross-sections of these two venturi grooves can be adjusted as desired by moving said displacement body.

By means of this design, it is relatively simple to change the cross-section of a conventional flow pipe or venturi pipe in the area of the throttle in such a way that two precisely adjustable venturi grooves are formed. This has the advantage that load fluctuations can be countered very quickly and simply. Furthermore, the displacement body can take a very simple form. In principle, any form can be used.

In order to minimise the design effort, the throttle is preferably formed by arranging two transverse pipes in the flow pipe. These transverse pipes, which typically display a roughly circular cross-section, like the flow pipe, may penetrate the flow pipe either entirely or partially. Commercially available tubes may be used in this context, and the manufacture of special assemblies is unnecessary.

The use of such tubes as components also allows inexpensive production in the case of differential pressure cleaners which have to be designed for high differential pressures.

In order to achieve the best possible gas flow from the point of view of fluid mechanics, a preferred embodiment of the invention displays guide plates arranged between the inner wall of the flow pipe and the surface areas of the transverse pipes, upstream and/or downstream of the slot.

The displacement body is preferably of tubular design and displays a circular cross-section. The use of such a hollow cylindrical displacement body as a component facilitates low-cost production, with commercially available pipes again being suitable for use in this context.

It is, however, also possible to use a displacement body of a different design, a solid cylindrical displacement body being particularly worthy of consideration in this context.

The displacement body is expediently positioned with its face ends in positive contact with the adjacent inner walls of the flow pipe.

In a preferred embodiment of the invention, recesses are provided in the face ends of the displacement body and matching guide rails are arranged on the adjacent inner wall areas of the flow pipe. This feature facilitates precise axial displacement of the displacement body and thus precise adjustment of the width of the slots of the two venturi grooves.

In another preferred embodiment, the throttle can be closed completely by the displacement body. This allows the differential pressure cleaner to be used as a stop valve at the same time, even providing a completely gas-tight seal due to the cleaning fluid above the closed displacement body. This thus dispenses with the need for gas gate valves.

Furthermore, the displacement body can be adjustable via a spindle drive which can typically be operated manually by a handwheel or similar.

However, it is also possible for the displacement body to be mechanically controlled as a function of the pressure.

In a preferred embodiment, the flow pipe and/or the transverse pipes and/or the displacement body and/or the guide plates are made of corrosion-resistant thermoplastic materials, e.g. polypropylene or polyvinyl chloride, using available semifinished products.

It is likewise possible to manufacture the differential pressure cleaner from steel or special steel.

The cleaning fluid is expediently injected by means of at least one swirl nozzle.

The cleaning fluid is preferably injected parallel to the direction of flow, although it is feasible for the cleaning fluid to be injected at an angle or perpendicular to the direction of flow.

Figure 2:
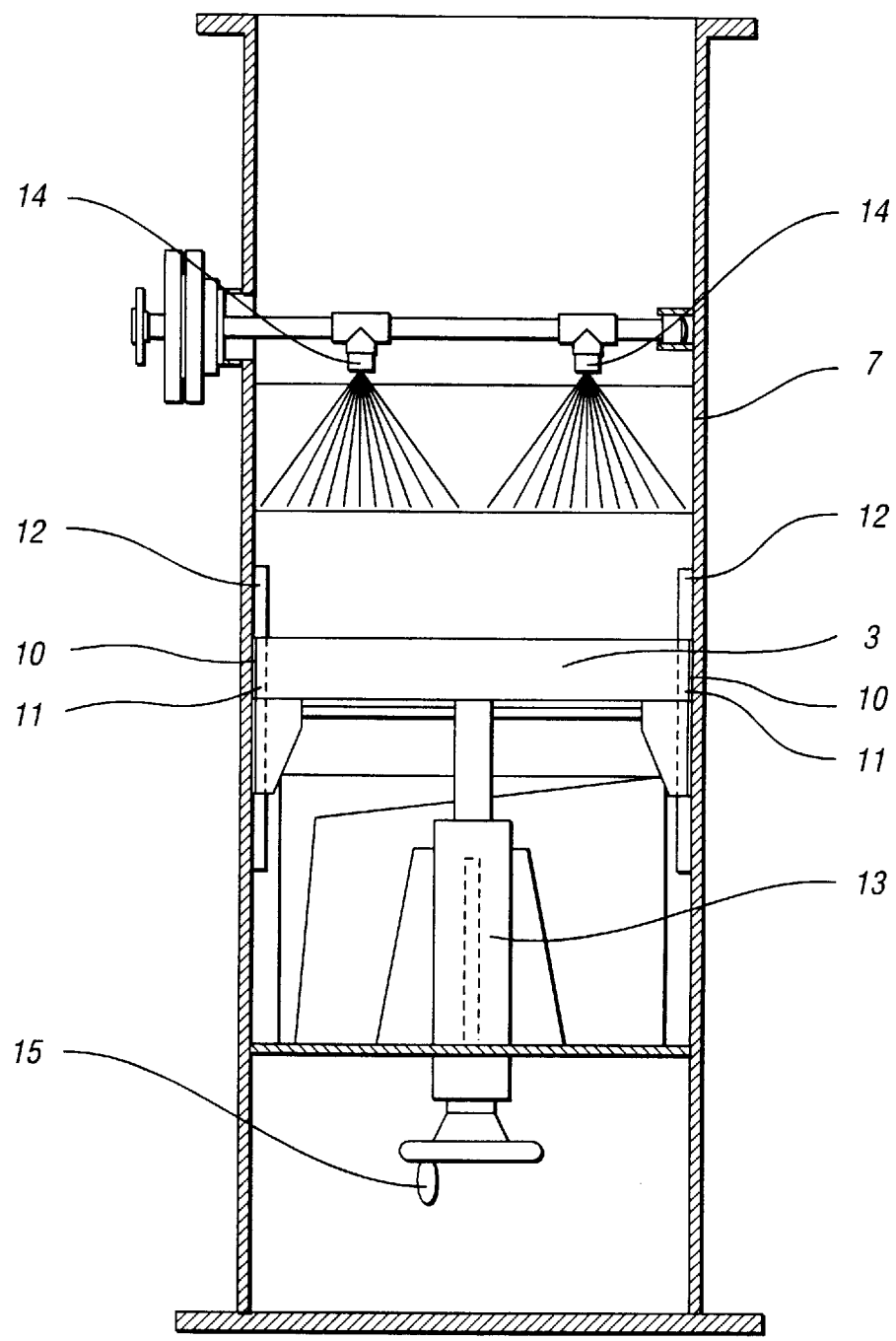
Figure 3:
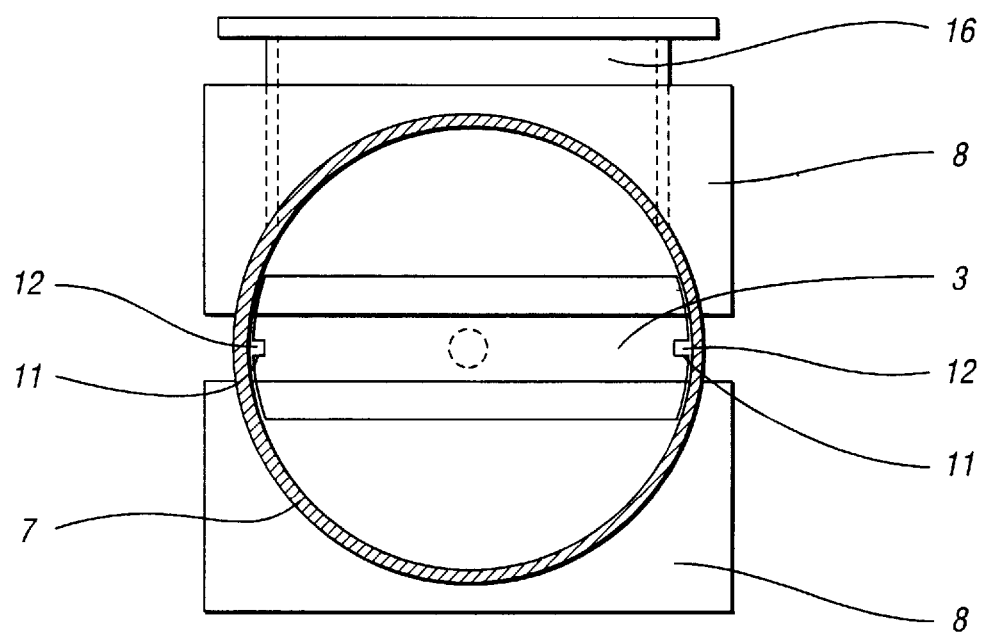
Figure 4:
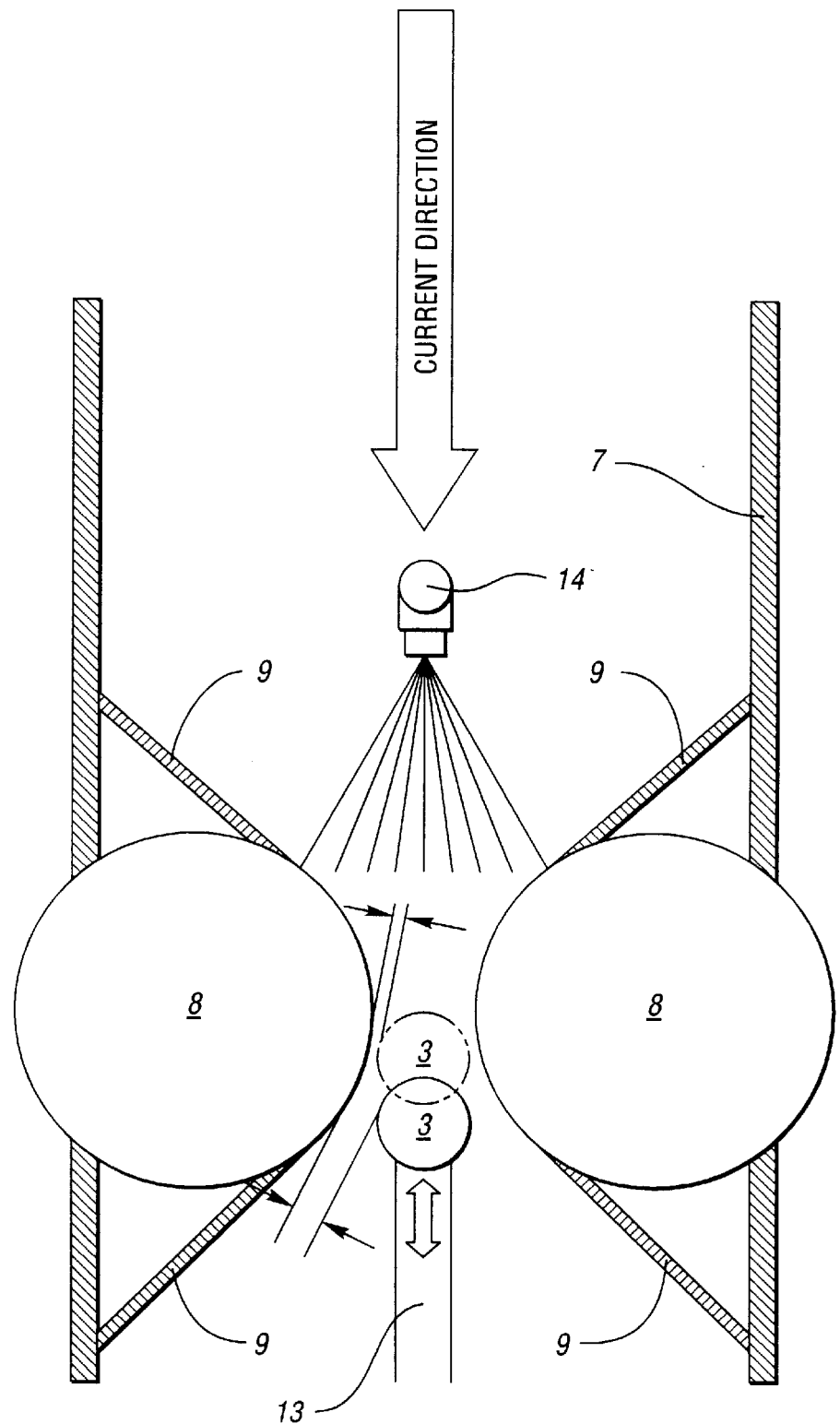

An example of the invention is illustrated in the drawings and described in detail below on the basis of the drawings. The drawings show the following:

FIG. 1: A vertical section through the differential pressure cleaner,

FIG. 2: A section along Line I—I in FIG. 1,

FIG. 3: A section along Line II—II in FIG. 1,

FIG. 4: An enlarged and more detailed view of the area of the venturi grooves in FIG. 1.

According to the drawing, the differential pressure cleaner comprises a flow pipe 7 which, as can be seen from FIG. 3, displays a circular cross-section, with a throttle 1 arranged roughly in the centre of the differential pressure cleaner. The throttle 1 is realised by two transverse pipes 8, which penetrate the flow pipe 7 almost entirely. The transverse pipes 8 display a circular cross-section, as can be seen from FIGS. 1 and 4.

The ratio of the diameter of the flow pipe 7 to the diameter of a transverse pipe 8 is approximately 2:1.

The throttle 1 takes the form of an approximately rectangular slot 2 at its narrowest point, as can be seen from FIG. 3. The slot is not totally rectangular; rather, the slot is slightly curved and is defined by the curvature of the inner wall of the flow pipe.

A displacement body 3 is arranged downstream of the slot 2 in the direction of flow, which is indicated by an arrow at the top edge of FIGS. 1, 2 and 4. This displacement body 3 is of tubular design in the practical example shown here, i.e. essentially a hollow cylinder with a circular cross-section. The ratio of the diameter of the displacement body 3 to the diameter of the transverse pipes 8 is roughly 1:3.

The displacement body 3 extends over the entire length of the slot and is arranged to be movable towards and away from the slot 2. In the practical example shown, the displacement body 3 can be adjusted by means of a spindle drive 13. The spindle drive 13 is operated manually via a handwheel 15.

Two roughly parallel venturi grooves 6 are arranged between the walls 4 of the throttle 1 and the outer wall 5 of the displacement body. The cross-sections of these two venturi grooves 6 can be adjusted as desired by moving the displacement body 3.

FIG. 4 shows two different enlarged and detailed settings of the displacement body 3 within the throttle 1. The closer to the throttle 1 the displacement body 3 is moved, the narrower the slot widths of the two venturi grooves 6 become.

The diameter of the transverse pipes 8 and the diameter of the displacement body 3 are matched to each other in such a way that the displacement body 3 can completely close the throttle 1 under extreme circumstances.

Guide plates 9 are arranged between the inner wall of the flow pipe and the surface areas of the transverse pipes, both upstream and downstream of the slot 2.

As can be seen from FIG. 3, the displacement body 3 is positioned with its face ends 10 in positive contact with the adjacent inner walls of the flow pipe. Furthermore, recesses 11 are provided in the face ends 10 of the displacement body 3 and matching guide rails 12 are arranged on the adjacent inner walls of the flow pipe.

Two swirl nozzles 14 for injecting the cleaning fluid are arranged above the throttle 1, being set in such a way that the cleaning fluid is injected parallel to the direction of flow.

As can be seen from FIG. 1, the flow pipe 7 extends in roughly L-shaped fashion, and is provided with a flange 16 to which a centrifugal separator can be connected.

LIST OF REFERENCE NUMBERS

1 Throttle
2 Slot
3 Displacement body
4 Wall
5 Outer wall of displacement body
6 Venturi groove
7 Flow pipe
8 Transverse pipe
9 Guide plate
10 Face end
11 Recess
12 Guide rail
13 Spindle drive
14 Swirl nozzle
15 Handwheel
16 Flange

I claim:

1. Differential pressure cleaner comprising a venturi channel which converges in the direction of flow to a minimum cross-section and then is provided with diverging side walls (4), wherein a throttle (1) formed thereby displays in its minimum cross-section a shape of a substantially rectangular slot (2), a displacement body (3) having an outer wall (5), the displacement body (3) being arranged downstream of the slot (2) extending over the entire length of the slot (2) and mounted in such a way so as to be movable towards and away from the slot (2), two substantially parallel venturi grooves (6) arranged between the diverging side walls (4) of the throttle (1) and the outer wall (5) of the displacement body (3), the cross-sections of the two venturi grooves (6) being adjustable by moving the displacement body (3), and at least one cleaning fluid feed device fitted over the throttle (1), characterized in that the venturi channel is formed by a flow pipe (7) and that two transverse pipes (8) are arranged in the flow pipe (7) to form the throttle (1).

2. The differential pressure cleaner as per claim 1, characterized in that each of the two transverse pipes (8) has a substantially circular cross-section.

3. The differential pressure cleaner as per claim 1, characterized in that the transverse pipes (8) penetrate the flow pipe (7) completely or partially.

4. The differential pressure cleaner as per claim 2, characterized in that the flow pipe (7) has a substantially circular cross-section.

5. The differential pressure cleaner as per claim 1, characterized in that the flow pipe (7) has a substantially circular cross-section.

6. The differential pressure cleaner as per claim 1, characterized in that guide plates (9) are arranged between the inner wall of the flow pipe and the surface areas of the transverse pipes, upstream and/or downstream of the slot (2).

7. The differential pressure cleaner as per claim 1, characterized in that the displacement body (3) is of tubular design.

8. The differential pressure cleaner as per claim 7, characterized in that the displacement body (3) has a substantially circular cross-section.

9. The differential pressure cleaner as per claim 1, characterized in that the face ends (10) of the displacement body (3) are in positive contact with the adjacent inner wall areas of the flow pipe.

10. The differential pressure cleaner as per claim 1, characterized in that recesses (11) are provided in the face ends (10) of the displacement body (3) and that matching guide rails (12) are arranged on the adjacent inner wall areas of the flow pipe.

11. The differential pressure cleaner as per claim 1, characterized in that the throttle (1) can be closed completely by the displacement body (3).

12. The differential pressure cleaner as per claim 11, characterized in that the displacement body (3) can be adjusted via a spindle drive (13).

13. The differential pressure cleaner as per claim 1, characterized in that the displacement body (3) can be adjusted manually.

14. The differential pressure cleaner as per claim 1, characterized in that the displacement body (3) can be mechanically controlled as a function of the pressure.

15. The differential pressure cleaner as per claim 1, characterized in that the flow pipe (7) and/or the transverse pipes (8) and/or the displacement body (3) and/or the guide plates (9) are made of corrosion-resistant thermoplastic materials.

16. The differential pressure cleaner as per claim 1, characterized in that the cleaning fluid is injected by means of at least one swirl nozzle (14).

17. The differential pressure cleaner as per claim 1, characterized in that the cleaning fluid is injected parallel to the direction of flow.

* * * * *

UNITED STATES PATENT AND TRADEMARK OFFICE
CERTIFICATE OF CORRECTION

PATENT NO : 5,826,800
DATED : October 27, 1998
INVENTOR(S) : Karl Reither

It is certified that error appears in the above-identified patent and that said Letters Patent are hereby corrected as shown below:

Column 6, line 4, delete "11" and replace with --1--.

Signed and Sealed this

Thirtieth Day of March, 1999

*Attest:*

*Attesting Officer*

Q. TODD DICKINSON

Acting Commissioner of Patents and Trademarks